United States Patent
Hiscock et al.

(10) Patent No.: US 11,144,470 B2
(45) Date of Patent: Oct. 12, 2021

(54) METHOD FOR MANAGING A CACHE MEMORY OF AN ELECTRONIC COMPUTER

(71) Applicant: Commissariat A L'Energie Atomique et aux Energies Alternatives, Paris (FR)

(72) Inventors: Thomas Hiscock, Grenoble (FR); Mustapha El Majihi, Grenoble (FR); Olivier Savry, Grenoble (FR)

(73) Assignee: Commissariat A L'Energie Atomique et aux Energies Alternatives, Paris (FR)

( * ) Notice: Subject to any disclaimer, the term of this patent is extended or adjusted under 35 U.S.C. 154(b) by 0 days.

(21) Appl. No.: 16/715,449

(22) Filed: Dec. 16, 2019

(65) Prior Publication Data
US 2020/0192813 A1    Jun. 18, 2020

(30) Foreign Application Priority Data
Dec. 17, 2018   (FR) ...................................... 18 73009

(51) Int. Cl.
*G06F 12/0895* (2016.01)
*G06F 7/58* (2006.01)
(Continued)

(52) U.S. Cl.
CPC ............ *G06F 12/0895* (2013.01); *G06F 7/58* (2013.01); *G06F 12/0855* (2013.01);
(Continued)

(58) Field of Classification Search
CPC ............. G06F 12/0855; G06F 12/0864; G06F 12/0891; G06F 12/0895; G06F 12/0897;
(Continued)

(56) References Cited

U.S. PATENT DOCUMENTS 5,133,061 A     7/1992  Melton et al.
8,595,441 B1 *  11/2013 Nakibly ................ G06F 12/084
                                                       711/130
(Continued)

FOREIGN PATENT DOCUMENTS

JP    2012-023618 A    2/2012

OTHER PUBLICATIONS

French Preliminary Search Report dated Sep. 30, 2019 in French Application 18 73009 filed on Dec. 17, 2018 (with English Translation of Categories of Cited Documents & Written Opinion), 12 pages.
(Continued)

*Primary Examiner* — Aracelis Ruiz
(74) *Attorney, Agent, or Firm* — Oblon, McClelland, Maier & Neustadt, L.L.P.

(57) ABSTRACT

Method for managing a cache memory comprising:
  the transformation of a received set address in order to find a word in the cache memory, into a transformed set address by means of a bijective transformation function,
  the selection of one or more line tags stored in the cache memory at the transformed set address.
in which:
  the transformation function is parameterized by a parameter q such that the transformed set address obtained depends both on the received set address and on the value of this parameter q, and for all the non-zero values of the parameter q, the transformation function permutes at least 50% of the set addresses, and
  during the same execution of the process, a new value of the parameter q is repeatedly generated for modifying the transformation function.

12 Claims, 3 Drawing Sheets

(51) Int. Cl.
*G06F 12/0855* (2016.01)
*G06F 12/0891* (2016.01)
*G06F 12/0897* (2016.01)

(52) U.S. Cl.
CPC ...... *G06F 12/0891* (2013.01); *G06F 12/0897* (2013.01); *G06F 2212/1021* (2013.01)

(58) Field of Classification Search
CPC .............. G06F 12/128; G06F 12/1416; G06F 2212/1021; G06F 2212/1052; G06F 7/58; G06F 21/556; G06F 21/76
See application file for complete search history.

(56) References Cited

U.S. PATENT DOCUMENTS

| | | |
|---|---|---|
| 2012/0297110 A1 | 11/2012 | Kavi |
| 2016/0170889 A1 | 6/2016 | Lee et al. |
| 2018/0046808 A1 | 2/2018 | Cammarota et al. |
| 2018/0165202 A1* | 6/2018 | Balakrishnan ...... G06F 12/0811 |

OTHER PUBLICATIONS

Wang, Z, et al., "New Cache Designs for Thwarting Software Cache-based Side Channel Attacks", ACM Special Interest Group on Computer Architecture, vol. 35, No. 2, 2007, pp. 494-505.
Gonzalez, A, et al., "Eliminating Cache Conflict Misses Through XOR-Based Placement Functions", 1997, 11 pages.
Liu, F, et al., "Random Fill Cache Architecture", 47$^{th}$ Annual IEEE/ACM International Symposium on Microarchitecture, 2014, pp. 203-215.

\* cited by examiner

METHOD FOR MANAGING A CACHE MEMORY OF AN ELECTRONIC COMPUTER

The invention relates to a method and a unit for managing a cache memory of an electronic computer.

Cache memories are used so that a process executed by a microprocessor is able to access information initially stored in the main memory more quickly.

In this application, the term "process" denotes both a programme and a subroutine of this programme or any other software executed by the microprocessor and capable of reading or writing in the cache memory.

The state of the cache memory is highly dependent on the addresses that have been accessed by the process or processes being executed by the microprocessor. Furthermore, the state of the cache memory at a given moment in time may relatively easily be observed by a third-party process executed by the microprocessor or simply by measuring the time to access the cache memory.

These properties of a cache memory have been exploited for developing attacks known by the term "Side-Channel Attack". These attacks allow secret information processed by a process being executed to be revealed or the operation of the process being executed to be modified in order to get round security measures. For example, a secret information is a cryptographic key used to encrypt or decrypt information. A security measure is, for example, the input of a PIN code.

For this purpose, side-channel attacks observe the state of the cache memory while the process under attack is being executed in order to determine the address or addresses being accessed by this process under attack. The addresses accessed depend on secret data being processed by the process under attack. Thus, knowing the addresses accessed by the process under attack allows information on this secret data to be obtained. In general, these attacks rely on the execution of a malicious process in parallel with the process under attack. This malicious process must be able to access precise addresses of the cache memory.

In order to enhance the robustness of the cache memory against these attacks, it has already been proposed to partition the cache memory into several separate partitions each associated with a respective process. The partition associated with a particular process is then only accessible by this process and cannot be read or written by the other processes executed in parallel by the electronic computer. Thus, a malicious process cannot gain access to the partition of another process and cannot therefore obtain information on the operation of this other process. However, this solution leads to a very inefficient use of the cache memory because the free areas in a partition cannot be used by other processes to store information in them.

Another solution has been provided in the following article: Zhenghong Wang et al.: "New cache designs for thwarting software cache-based side-channel attacks", ACM SIGARCH Computer architecture news, volume 35, pages 494-505, 2017.

The solution described in this article is attractive in that it does not partition the cache memory. More precisely, this article teaches that, when a first process tries to read a word at an address @r, it transmits a request to the cache memory. This request contains the address @r. The address gr contains an address $@_{Si,r}$ of a set $S_{i,r}$ of lines of the cache memory likely to contain the word sought. If the word sought is not found in this set $S_{i,r}$ of lines, then this causes a "miss". In the case of a miss, a set of new lines containing the word sought is loaded into the cache memory from the main memory of the electronic computer. Normally, the new lines loaded are stored in place of the preceding lines of the set $S_{i,r}$. However, if the preceding lines of the set $S_{i,r}$ had been loaded into the cache memory by a second process, different from the first process, then an external interference is detected. In this case, and only in this case, the article by Zhenghong teaches:

that another set $S_{i,r}'$ of lines is randomly chosen within the cache memory, the new lines loaded are stored in the set $S_{i,r}'$ and not in the set $S_{i,r}$, the lines of the set $S_{i,r}$ are marked as being invalid, and the addressing of the cache memory is modified for the first process only, so as to make the address @r now correspond to the set $S_{i,r}'$ rather than to the set $S_{i,r}$.

Thus, the observation of the state of the cache memory, and in particular of the set $S_{i,r}$, by a second process does not reveal any information on the information processed by the first process.

The method described in this article therefore enhances the robustness of the cache memory against side-channel attacks in which a malicious process is used to observe the state of the cache memory. On the other hand, it is relatively ineffective against side-channel attacks that observe the state of the cache memory, for example, by measuring the time for accessing the latter without necessarily using, for this purpose, the execution of a malicious process by the same electronic computer. Indeed, the time for accessing the cache memory is very different in the following two cases:

the word sought is found in the cache memory, which corresponds to the situation known as a "hit", and the word sought is not already found in the cache memory, which corresponds to the situation known as a "miss".

In the case of a miss, the word sought must first of all be loaded, from the main memory, into the cache memory before it can be used. The time for accessing the cache memory is therefore much longer in the case of a miss than in the case of a hit. Thus, by observing the time for accessing a particular set $S_{i,r}$ of lines of the cache memory, it is possible to identify the time at which a new word is loaded into this set $S_{i,r}$ and the number of times where this set of lines is accessed. By correlating these pieces of information with the operation of the process under attack, certain secret information may then be deduced.

Prior art is also known from:

US2016/170889A1,

US2012/297110A1,

US2018/046808A1, and

JP2012023618A.

The invention aims to provide a method for managing the cache memory of an electronic computer that is more robust than that described in the article by Zhenghong Wang et al.

For this purpose, one subject of the invention is therefore a method for managing the cache memory of an electronic computer.

The embodiments of this method may comprise one or more of the features of the dependent claims.

Another subject of the invention is a unit for managing a cache memory of an electronic computer for the implementation of the aforementioned method.

The invention will be better understood upon reading the description that follows, given solely by way of non-limiting example and with reference to the drawings, in which.

In these figures, the same references are used to denote the same elements. In the following part of this description, the features and functions well known to those skilled in the art are not described in detail.

Figure 1:
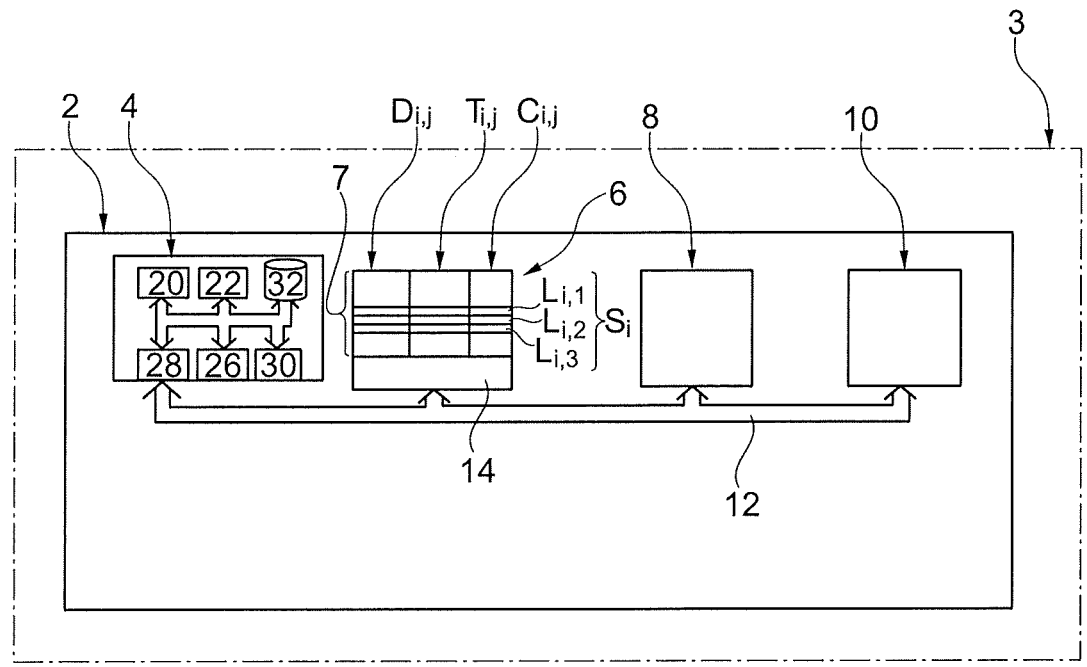
FIG. 1 is a schematic illustration of the architecture of an electronic computer equipped with a cache memory.

FIG. 1 shows schematically the architecture of an electronic computer 2. This computer 2 is typically integrated into a larger system 3 at least one part of whose operation it controls and monitors. The system 3 is for example a mainframe computer, a mobile telephone, a smartphone or any other electronic apparatus whose operation is controlled, at least in part, by the computer 2.

Conventionally, the computer 2 comprises:
at least one microprocessor 4,
a cache memory 6,
a main memory 8,
a mass storage 10, and
buses 12 for transmission of information connecting together these various elements of the computer 2.

The cache memory 6 is typically faster than the main memory 8 which is itself faster than the mass storage 10. The speed of a memory corresponds to the access time required to access information stored in this memory. Currently, typically, the access time for a cache memory is less than 30 ns or 20 ns and, generally speaking, greater than 1 ns. The time for accessing a main memory is currently typically less than 500 ns or 100 ns and, generally speaking, greater than 30 ns or 50 ns. The time for accessing a mass storage device is currently typically greater than 1 µs or 10 µs and, generally speaking, less than 10 ms.

Typically, the smaller the size of a memory of the computer 2, the higher the speed of the memory. Thus, the size of the cache memory 6 is less than the size of the main memory 8 which is itself less than the size of the mass storage 10. The size of a memory is expressed in bytes. The size of the cache memory 6 is, for example, less than 4 MB and, usually greater than 60 kB. The size of the main memory 8 is usually greater than 256 MB or 1 GB and, generally speaking, less than or equal to 16 GB or 32 GB. The size of a mass storage 10 is, on the other hand, usually greater than 4 GB or 1 TB.

Here, the memories of the computer 2 are classified by increasing access time. Thus, in the following, the expression "memory of higher rank" denotes a memory whose access time is greater than the current memory.

Generally speaking, the memories 6 and 8 are random-access volatile memories. For example, the memory 6 is a memory of the SRAM (Static Random Access Memory) type. The main memory 8 is for example a memory of the DRAM (Dynamic Random Access Memory) type.

The mass storage 10 is generally a non-volatile memory. Many different technologies exist for such a mass storage. For example, the memory 10 may be a magnetic tape, a hard disk, an optical disk such as a CD, a DVD or a blue-ray disk, a magneto-optical disk, a flash memory, an SSD (Solid State Drive) memory or other.

The memory 10 contains for example a saved copy of the binary code of the processes to be executed by the microprocessor 4. The memory 10 may also contain copies of the data to be processed by the various processes able to be executed by the microprocessor 4. Typically, the binary code of the processes and the data to be processed are, for example, loaded into the memory 8 from the memory 10 when the computer 2 is powered up and/or in response to a command for rebooting the computer 2 or when the execution of a new process by the computer 2 is triggered.

The memory 6 may be a memory external to the microprocessor 4 as shown in FIG. 1. In this case, the memory 6 is, for example, formed on a substrate mechanically separate from the substrate on which the various elements of the microprocessor 4 are formed.

In order to simplify the description, it is considered here that the memory 6 comprises a single level of cache memory, in other words typically the level known by the expression "L1 cache". However, everything that is described in the following, in this particular case, is readily transposable by those skilled in the art to the case of cache memories comprising several levels of cache memory.

In the following, unless otherwise indicated, the term "word" denotes both an instruction or portion thereof of the binary code of a process executable by the microprocessor 4 and a data value or portion thereof corresponding to an operand on which an instruction executed by microprocessor 4 operates.

The cache memory 6 is used as a storage intermediate between the main memory 8 and the microprocessor 4. Instead of directly accessing the main memory 8 which exhibits significant latencies, the microprocessor 4 will firstly look to see if the word is present in the cache memory. There are then the two following scenarios:

Case 1): The word is present in the cache memory 6, which corresponds to the case known using the term "hit" or "cache hit". In this case, the word is directly transferred to the microprocessor 4 from the cache memory 6. The memories of higher rank than the memory 6 are not then accessed in order to obtain this word.

Case 2): The word is absent from the cache memory 6. This scenario corresponds to that known using the term "miss" or "cache miss". In this case, the cache memory must go and look for the absent word in a memory of higher rank, in other words here typically in the main memory 8. This scenario here is referred to as a "miss". The miss therefore naturally leads to a longer time for accessing the word sought.

The cache memory 6 typically comprises an information storing medium 7. The medium 7 is divided into several lines $L_{i,j}$ of fixed length. Each line comprises a data field $D_{i,j}$. Each data field $D_{i,j}$ is divided into $N_m$ words of fixed length. The lengths of a word, of a field and of a line are expressed by the number of bits composing them. For example, the length of a word is typically equal to 32 bits or 64 bits. In the following, the description is presented in the particular case where the length of a word is equal to 32 bits. Each field $D_{i,j}$ comprises an identical number of words. For example, here, each field $D_{i,j}$ comprises four words. Thus, the length of the field $D_{i,j}$ is 128 bits.

The lines of the cache memory 6 are assembled into distinct sets $S_i$. Each set $S_i$ contains W lines $L_{i,j}$. The number W is the same for all the sets $S_i$. In the following, the index "i" identifies unambiguously a set $S_i$ from amongst the other sets of lines that the memory 6 comprises. For example, the index i is a number of order in the range between 1 and s, where s is an integer number equal to $T/(W \cdot L)$, where:

T is the size of the cache memory expressed in bytes,
L is the number of bytes per line, and
W is the number of lines in each set $S_i$.

The index "j" identifies unambiguously a particular line of a set $S_i$. Here, the index j is in the range between 1 and W. This is shown in FIG. 1 in the particular case where W is equal to three.

In this embodiment, the cache memory 6 is an associative memory with W ways, hence known by the expression "W-way associative memory". In this case, the integer number W is greater than or equal to two and generally less than 128 or 64 or 16.

The position of each set $S_i$ within the cache memory 6 is identified by an address $@_{Si}$ called "line set address". Here, there are accordingly s different line set addresses $@_{Si}$. In the following, the minimum number of bits needed to code the address $@_{Si}$ of a set $S_i$ is denoted n and the set which contains all the possible addresses $@_{Si}$ is denoted $E_S$.

The position of a particular word in the field $D_{i,j}$ is identified by an index "$d_r$" which identifies the position of a word within this line. The index $d_r$ is a number in the range between 1 and $N_m$. Typically, the words of the same field $D_{i,j}$ are placed immediately behind one another.

In addition to the field $D_{i,j}$, each line comprises:
a line tag $T_{i,j}$, and
a line counter $C_{i,j}$.

The tag $T_{i,j}$ contains a value which allows the line $L_{i,j}$ that contains the word sought to be unambiguously selected from amongst the W lines $L_{i,j}$ of the set $S_i$. For this purpose, the tag $T_{i,j}$ is constructed from the bits of the address @r of the word sought which have not already been used for determining the address $@_{Si}$ of the set $S_i$ able to contain the line $L_{i,j}$ and for determining the index $d_r$. For example, a hash function may be applied to these bits of the address of the word sought in order to obtain the tag $T_{i,j}$.

The counter $C_{i,j}$ contains a value which allows it to be determined whether the line $L_{i,j}$ is obsolete or otherwise. The construction of the value of the counter $C_{i,j}$ and its use are described in more detail hereinbelow.

Each line $L_{i,j}$ may comprise additional fields such as a bit of information which allows this line to be marked as being valid and, in alternation, invalid. Conventionally, a line $L_{i,j}$ marked as invalid must be processed as if it doesn't contain any words. Thus, a line $L_{i,j}$ marked as invalid will be deleted and replaced by another line loaded from the main memory 8.

Each line $L_{i,j}$ may also comprise a bit which allows this line $L_{i,j}$ to be marked as having been modified. This bit is often referred to as "dirty". When a line $L_{i,j}$ is marked as modified, the field $D_{i,j}$ that it contains is then copied into the main memory 8 before, for example, this line is marked as invalid.

The cache memory 6 also comprises an electronic management unit 14. This unit 14 is notably configured for:
in response to a request for reading a word in the cache memory 6, sending the word sought to the generator of the request if this word has been found in the cache memory 6 and, otherwise, triggering a miss, and
in response to a request for writing a word in the cache memory 6, replacing the old value of this word stored on the medium 7 by its new value and, in the case where the word to be written could not be found in the cache memory 6, triggering a miss.

For example, when the unit 14 triggers a miss, it sends a request to a memory of higher rank, typically here the main memory 8, for triggering the loading into the cache memory 6 of the lines which contain the word sought. The unit 14 subsequently manages the storing of the lines supplied to it in response to its request.

The microprocessor 4 here comprises, notably:
an arithmetic and logic unit 20;
a set 22 of registers;
a control module 26;
an interface 28 for the input/output of data,
a loader 30 of instructions comprising a serial counter,
a file 32 of instructions to be executed.

By way of illustration, the microprocessor 4 conforms to the RISC (Restricted Instruction Set Computer) architecture.

The loader 30 loads into the file 32 the next instruction to be executed by the unit 20 from the memory 6 or from a memory of higher rank. More precisely, the loader 30 loads the instruction to which the serial counter points.

The unit 20 is notably configured for executing, one after another, the instructions loaded into the file 32. The instructions loaded into the file 32 are generally systematically executed in the order that these instructions have been stored in this file 32. The unit 20 is also capable of storing the result of the execution of these instructions in one or more of the registers of the set 22.

The module 26 is configured for moving data between the set 22 of registers and the interface 28. The interface 28 is notably designed to read words from the memory 6 and, in alternation, to write words into the memory 6. Here, in order to read a word, the microprocessor 4 generates and sends, via the interface 28, a request to read this word. This read request notably comprises an address @r, physical or virtual, of the word to be read. The virtual address of a word is the address of this word in the memory space of the process being executed by the microprocessor 4. This virtual address corresponds to a physical address in the main memory 8 where the word sought is stored. Conventionally, it is a conversion module known under the acronym MMU (for Memory Management Unit) which is responsible for the conversion of the virtual addresses into physical addresses at the time when this becomes necessary.

The address @r comprises for this purpose:
an address $@_{Si,r}$ of a set $S_i$ of the cache memory 6 able to contain the word to be read;
an index $d_r$ which identifies the position of the word to be read in the field $D_{i,j}$ of the W lines $L_{i,j}$ of the set $S_i$ identified by the address $@_{Si,r}$, and
a tag $T_r$ which allows the line that contains the word to be read, if this line exists, to be unambiguously selected from amongst all of the W lines $L_{i,j}$ of the set $S_i$ corresponding to the address $@_{Si,r}$.

The tag $T_r$ is typically constructed by implementing the same algorithm as that implemented for constructing each of the tags $T_{i,j}$ stored in the cache memory 6. Thus, if one of the lines $L_{i,j}$ of the set $S_i$ contains the word to be read, its tag $T_{i,j}$ is identical to the tag $T_r$. This allows it to be identified unambiguously as being the line that contains the word to be read from amongst the W lines $L_{i,j}$ of the set $S_i$.

A request for writing a word in the memory 6 is, for example, practically identical to the read request except that it additionally comprises a numerical value $V_r$ containing the new value of the word to be stored in the cache memory 6.

Figure 2:
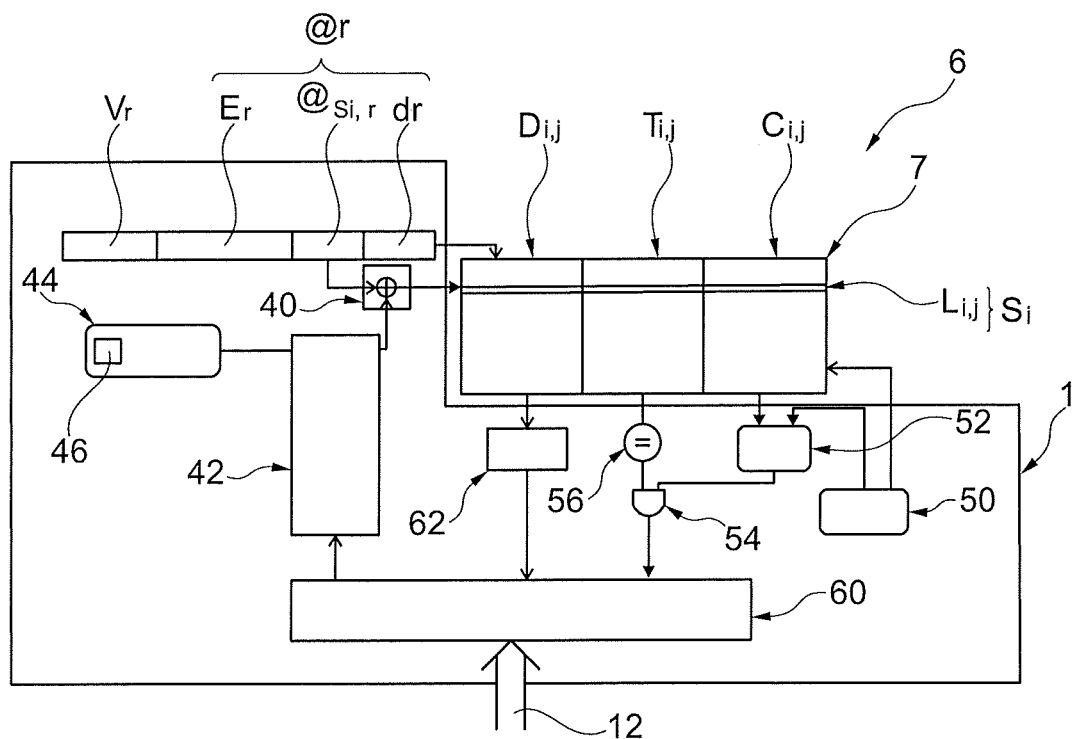
FIG. 2 is a schematic illustration of a unit for managing the cache memory of the computer in FIG. 1.

FIG. 2 shows schematically a first possible embodiment of the unit 14 for managing the cache memory 6. The unit 14 is configured for implementing the management method described in more detail with reference to FIG. 3.

The unit 14 comprises registers in which the various data contained in the read or write request received by the memory 6 are stored. In this figure, the registers containing the tag $T_r$, the address $@_{Si,r}$, the index $d_r$ and the value $V_r$ carry the references $T_r$, $@_{Si,r}$, $d_r$ and $V_r$, respectively.

The unit 14 comprises a function 40 for transforming the address $@_{Si,r}$ into an address $@_{Si,t}$ of a transformed set. The function 40 is a bijective function which associates, with each address $@_{Si,r}$, one and only one address $@_{Si,t}$. Such a function 40 is known under the term "permutation". Thus, irrespective of the address $@_{Si,r}$, this address $@_{Si,t}$ belongs to the set $E_s$. More precisely, the function 40 is designed to permute at least $P_e$ % of the addresses $@_{Si,r}$. In other words, the function 40 associates with more than $P_e$ % of the addresses $@_{Si,r}$ contained in the set $E_s$, an address $@_{Si,t}$ whose value is different from the value of the address $@_{Si,r}$ with which it is associated by this function 40. Here, the number $P_e$ is greater than 50 and, preferably, greater than 80 or 90 or 95. Ideally, $P_e$ is equal to 100.

The function 40 is a function parameterized by the value of a parameter q. Thus, the value of the address $@_{Si,t}$ depends not only on the value of the address $@_{Si,r}$ but also on the value of the parameter q. Accordingly, each time that the value of the parameter q is modified, the function 40 is modified, in other words it associates a new address $@_{Si,t}$ with the same address $@_{Si,r}$. Each time that the parameter q is modified, this modification affects a group of addresses $@_{Si,r}$ containing at least $P_e$ % of the addresses $@_{Si,r}$. Thus, after having modified the value of the parameter q, each of the addresses $@_{Si,r}$ of this group is transformed by the function 40 into an address $@_{Si,t}$ different from that obtained prior to the modification of the value of the parameter q.

There exists a large number of ways of permuting numbers of a set. Here, the function 40 simply uses the following relationship: $@_{Si,t}=@_{Si,r}$ XOR q, where the symbol "XOR" is the "exclusive or" operation. For this purpose, the size of the parameter q here is equal to the size of the address $@_{Si,r}$ and hence equal to n bits.

The most recent value of the parameter q is stored in the header of a file 42 containing R+1 registers. The size of each of the registers in the file 42 is equal to n bits. This file 42 operates on the FIFO (acronym for "First In First Out") principle. Thus, in this embodiment, the file 42 stores both the most recent value of the parameter q but also its R preceding values. Typically, the number R is an integer in the range between 1 and $Lmax_R$. The upper limit $Lmax_R$ is, preferably, equal to the value beyond which the time taken to try and find a word in the cache memory 6 using, successively, all the values of the parameter q stored in the file 42 become greater than the time needed to read the word sought from the main memory 8. Accordingly, typically, the number R is less than 50 and, generally speaking, less than 16 or 10. Here, the number R is chosen equal to 8.

The unit 14 also comprises a generator 44 of new values for the parameter q. Each time that the generator 44 generates a new value, the latter is stored as the most recent value in the file 42 and the oldest value of the parameter q contained in the file 42 is deleted.

The generator 44 is configured for repeatedly triggering the generation of a new value of the parameter q during the execution of the same process by the microprocessor 4. Thus, the function 40 is repeatedly modified even though the processes have not finished being executed. Here, the generator 44 triggers the generation of a new value of the parameter q at regular intervals. The shorter this interval, the more the robustness of the computer 2 against side-channel attacks increases. On the other hand, the shorter this duration, the more the number of misses increases, which slows down the execution of the processes. The duration of this interval is therefore chosen so as to obtain an acceptable compromise between robustness against side-channel attacks and speed of execution of the processes. Here, the generation of a new value of the parameter q is triggered as soon as a counter 46 for numbers of accesses to the cache memory 6 exceeds a limit $Lmax_{46}$. Generally speaking, the limit $Lmax_{46}$ is greater than 50 or 100 and less than 50,000 or 20,000. Here, the limit $Lmax_{46}$ is in the range between 100 and 20,000 and, preferably, between 100 and 5,000 or between 100 and 1,000. In this embodiment, the limit $Lmax_{46}$ is equal to 1,000. Each time that the limit $Lmax_{46}$ is reached, the generator 44 resets the access counter 46 to zero.

In this embodiment, the generator 44 randomly or pseudo-randomly draws each new value of the parameter q from a set $E_q$ of $2^n$ values in the range between 0 and $2^n-1$.

The unit 14 also comprises a counter 50 for modification of the function 40. This counter 50 is incremented by a regular increment each time a new value of the parameter q is generated. Typically, the increment is equal to one. For example, for this purpose, the incrementation of the counter 50 is triggered by the generator 44 each time that it generates a new value of the parameter q. When the counter 50 reaches a maximum limit $Lmax_{50}$, it generates an overflow signal and returns to its initial value, in other words here its zero value.

In this embodiment, the value of the limit $Lmax_{50}$ is greater than the number R and, preferably, much greater than the number R. For example, the limit $Lmax_{50}$ is chosen to be higher than 100 or 500 or 1000.

The counter 50 is connected to one input of a comparator 52. The comparator 52 compares the current value of the counter 50 with the value of the line counter $C_{i,j}$ of the line selected by means of the address $@_{Si,t}$. In the case of agreement between these two values, the comparator 52 sends a signal of agreement to a logic circuit 54. In the opposite case, the comparator 52 sends a signal of absence of agreement to the circuit 54. Here, there is agreement between the value of the counter $C_{i,j}$ and the value of the counter 50 if the value of the counter $C_{i,j}$ is less than or equal to $C_m$ and greater than or equal to $C_m-M$, where:

$C_m$ is the current value of the counter 50, and

M is a constant integer number, greater than or equal to zero.

Preferably, the number M is chosen equal to or less than the number R. Here, the number M is equal to the number R. The value of the counter $C_{i,j}$ for a line $L_{i,j}$ is equal to the value of the counter 50 at the time when this line $L_{i,j}$ was stored in the cache memory 6. Thus, there is agreement between the values of the counter $C_{i,j}$ and of the counter 50 only if, between the time when the line $L_{i,j}$ was stored in the cache memory 6 and the time when the comparator 52 compares the values of the counter $C_{i,j}$ and of the counter 50, the function 40 has been modified at the most M times.

The circuit 54 comprises another input connected to an output of another comparator 56. The comparator 56 compares the tag $T_r$ received with the tags $T_{i,j}$ of the lines of the set $S_i$ selected by means of the address $@_{Si,t}$. If one of the tags $T_{i,j}$ of the selected set $S_i$ corresponds to the tag $T_r$, then a signal for selecting this line $L_{i,j}$ as being that which contains the word sought is generated. In the opposite case, in other words when none of the tags $T_{i,j}$ of the selected set $S_i$ corresponds to the tags $T_r$, a signal for absence of selection is generated. A tag $T_{i,j}$ corresponds to the tag $T_r$ if these two tags are identical.

The selection signal and, in alternation, the signal for absence of selection is received by the circuit 54.

The circuit 54 transmits to an programmable logic controller 60 a hit signal which indicates that a line $L_{i,j}$ corresponding to the received address @r has been found only if:

for this line $L_{i,j}$, the comparator 56 has generated a selection signal, and for this same line $L_{i,j}$, the comparator 52 has generated a signal of agreement.

This hit signal therefore corresponds to the case of a hit. In the other case, a signal for a miss is transmitted to the programmable logic controller 60.

In parallel with the comparator 56, the unit comprises an extractor 62 of words. This extractor 62 extracts, from the field $D_{i,j}$ of the same line $L_{i,j}$ as that currently being processed by the comparator 56, the word situated at the position identified by the received index $d_r$.

The programmable logic controller 60 is notably configured for:

selecting the W lines $L_{i,j}$ from the set $S_i$ situated at the address $@_{Si,t}$ constructed by the function 40 based on the received address $@_{Si,r}$;

if one of the W lines $L_{i,j}$ selected triggers a hit signal, then the programmable logic controller 60 triggers in response, in the case of a read request, the transmission of the extracted word, and, in the case of a write request, the writing of the value $V_r$ received at the location of the word situated at the position indicated by the index $d_r$ in the field $D_{i,j}$ of this line, selecting a preceding value of the parameter q in the file 42, and loading from the main memory 8 and storing in the cache memory 6 a new set of lines containing the word corresponding to the address @r contained in the received request if this word could not be found in the cache memory 6.

The operation of the computer 2 and of the cache memory 6 will now be described with reference to the method in FIG. 3.

During an initialization/reset phase 70, the generator 44 generates an initial value of the parameter q and stores it in the file 42. The value of the counter 50 is reset to zero. Potentially, the set of lines of the cache memory 6 are marked as being invalid.

Subsequently, a phase 72 for execution of a process by the computer 2 is triggered. The computer 2 here has the capacity to execute several processes simultaneously. For this purpose, for example, the computer 2 executes an operating system which allows the simultaneous execution of these various processes by the microprocessor 4 to be ordered over time. By virtue of this ordering, all the processes are executed in alternation by this same microprocessor 4. Similarly, the cache memory 6 is accessible and usable by all the processes being executed simultaneously. In particular, in order to increase the efficiency and the speed of execution of each of the processes, each of them can read and write words in any given location of the medium 7. In other words, here, the medium 7 is not divided into several partitions whose usage of each of these partitions would be reserved for one particular process.

The execution of several processes by a microprocessor is well known to those skilled in the art. Thus, only the access and the management of the cache memory 6 are described in more detail in the following. More precisely, in the following are described:

a step 80 for storing lines $L_{i,j}$ in the cache memory 6, then a step 82 for read access, and finally, a step 84 for write access to this cache memory 6.

In addition, in parallel with these steps 80, 82 and 84, during the execution of the processes by the microprocessor 4, the unit 14 repeatedly executes a step 86 for modification of the function 40. During this step 86, at each access to the cache memory 6, the counter 46 is incremented during an operation 87 and the new value of the counter 46 is compared with the limit $Lmax_{46}$. If the limit $Lmax_{46}$ is reached, during an operation 88, the generator 44 generates a new value of the parameter q. This new value is stored in the file 42 as the most recent value of the parameter q. During the operation 88, the counter 50 is also incremented by one increment and the counter 46 is reset to its zero value.

The most recent value of the parameter q is the default value used to construct the address $@_{Si,t}$ from the address $@_{Si,r}$. Thus, during the execution of a process, the addressing of the cache memory is modified several times. In addition, each modification simultaneously impacts the majority of the set addresses. Thus, the addressing of the cache memory 6 prior to the modification of the function 40 is very different from the addressing of the memory 6 after this modification. Accordingly, this renders the implementation of the side-channel attacks, which try to obtain secret information based on the observation of the accesses of a process to this cache memory 6, very difficult.

For example, during a first operation, a first cryptographic process executed by the microprocessor 4 reads a secret cryptographic key $K_r$ at an address @r. The address @r contains the tag $T_r$, the address $@_{Si,r}$ and the index $d_r$. The address $@_{Si,r}$ is then transformed, by the function 40, into an address $@_{S1,t}$. This request thus triggers an access to first lines $L_{1,j}$ of a set $S_{1,t}$ situated in the memory 6 at the address $@_{S1,t}$. Later on, the function 40 is modified by changing the most recent value of the parameter q. After this modification, the address $@_{Si,r}$ is transformed, by the function 40, into an address $@_{S2,t}$ different from the address $@_{S1,t}$. The same operation for reading the key $K_r$ therefore triggers an access to second lines $L_{2,j}$ of a second set $S_{2,t}$ situated at the address $@_{S2,t}$. It is therefore more difficult to obtain information on the type and the nature of the information accessed in the cache memory by observing only the access to this cache memory 6.

Following a modification of the function 40, the word which beforehand was sought within the set $S_{1,t}$ is now sought within the set $S_{2,t}$. However, the lines of the set $S_{1,t}$ are not moved towards the set $S_{2,t}$ each time that the function 40 is modified. Only the addressing of the cache memory is modified. This leads to the following situation: prior to the modification of the function 40, the word sought corresponding to the address @r has been stored in the set $S_{1,t}$. Accordingly, prior to the modification of the function 40, this word is quickly found again in the cache memory from the address @r because the function 40 allows the address $@_{S1,t}$ to be obtained from the address $@_{Si,r}$. After the modification of the function 40, for the same address @r, the function 40 generates another address $@_{S2,t}$ different from the address $@_{S1,t}$. Since the lines of the set $S_{1,t}$ have not been moved to the set $S_{2,t}$, the word sought is not found in the set $S_{2,t}$ and a miss is triggered.

A first secondary effect linked to the modification of the function 40 is therefore that this increases the number of misses during a period of time that immediately follows the modification of this function 40. This temporarily slows down the execution of the process during this period.

It will be noted that moving the lines of the set $S_{1,t}$ to the set $S_{2,t}$ would have avoided this miss. However, as previously indicated, the modification of the function 40 affects the majority of the set addresses. In order to avoid this miss, each time that the function 40 is modified, it would therefore be necessary to move the majority of the lines of the cache memory 6. In practice, such a movement of the majority of the lines of the cache memory takes a lot of time and would slow down unacceptably the execution of the process by the computer 2. In fact, such a movement of lines is worse than the first secondary effect indicated hereinabove.

A second secondary effect linked to the absence of movement of the lines of the cache memory 6 is that, following a modification of the function 40, there may exist several copies of the same line at various locations in the cache memory. However, some of these copies may contain obsolete data. This is illustrated in the case of the sets $S_{1,t}$ and $S_{2,t}$ previously introduced. Prior to the modification of the function 40, the set $S_{1,t}$ contains a copy of the line $L_{1,j}$ which comprises the word sought. The set $S_{2,t}$ does not comprise any copy of this line $L_{1,j}$. After modification of the function 40, the search for the word corresponding to the address @r in the set $S_{2,t}$ causes a miss. Conventionally, in response to this miss, a line $L_{2,j}$ containing the word sought is transferred from the main memory 8 to the cache memory 6 and stored in the set $S_{2,t}$. Accordingly, from that moment on, the cache memory 6 comprises two copies of the same word, one being contained in the line $L_{1,j}$ and the other being contained in the line $L_{2,j}$. It is also assumed that, after the modification of the function 40, the word corresponding to the address @r is modified. This modification is then only stored in the line $L_{2,j}$ such that the is now obsolete. Let it be assumed now that, after several later modifications of the function 40, the function 40 again associates the address $@_{Si,r}$ with the lines of the set $S_{1,t}$. Accordingly, in response to a request for reading the word situated at the address @r, the cache memory 6 will return the obsolete value of this word contained in the line $L_{1,j}$.

As will be understood upon reading the following part of the description, the use of the file 42 allows the first secondary effect to be minimized, whereas the use of the counter 50 and of the counters $C_{i,j}$ allows the second secondary effect to be minimized.

Also, in parallel with the steps 80, 82, 84 and 86, the method comprises a step 89 for resetting the cache memory 6. The step 89 is triggered each time that the programmable logic controller 60 receives the overflow signal, in other words each time that the counter 50 reaches the limit $Lmax_{50}$. During the step 89, the counter 50 is reset to its zero value. In addition, the programmable logic controller 60 marks all of the lines of the cache memory 6 as being invalid. Indeed, following the resetting of the value of the counter 50, the values of the counters $C_{i,j}$ no longer allow an obsolete line to be definitively distinguished from a non-obsolete line. The marking of each line as being invalid causes a new loading of all the lines of the cache memory from the main memory 8 and, at the same time, the updating of the values of the counters $C_{i,j}$ associated with each of the lines.

The execution of the step 80 is typically triggered in the case of a miss, in other words in the case where the word whose address @r is specified in the read or write request could not be found in the cache memory 6.

In this case, during an operation 90, the programmable logic controller 60 triggers the loading into the cache memory 6, from the main memory 8, of a set of W lines one of which contains the word sought. Conventionally, this set of W lines is a set of W lines immediately contiguous with one another in the main memory 8. This operation for transferring W lines from the main memory 8 to the cache memory 6 is carried out in a conventional manner and is not therefore described in more detail.

During an operation 92, the unit 14 stores the W lines transferred from the main memory 8 in place of the W lines of the set $S_{i,t}$ situated at the address $@_{Si,t}$. The address $@_{Si,t}$ is the transformed address obtained from the address $@_{Si,r}$ contained in the read or write request which has triggered this miss. The address $@_{Si,t}$ is obtained by means of the function 40 parameterized with the most recent value of the parameter q.

During an operation 94, each time that a new line $L_{i,j}$ is stored in the cache memory 6, the value of the counter $C_{i,j}$ associated with this line is taken as equal to the current value of the counter 50.

Lastly, during an operation 96, the word identified by the request received is read or written.

The step 82 begins by the receipt, during an operation 100, of a read request for reading a word. This request is generated by the microprocessor 4. This read request notably contains the address @r of the word to be read and hence the tag $T_r$, the address $@_{Si,r}$ and the index $d_r$.

During an operation 102, the tag $T_r$, the address $@_{Si,r}$ and the index $d_r$ are stored in the respective registers $T_r$, $@_{Si,r}$ and $d_r$ of the management unit 14.

During an operation 104, the function 40 then transforms the address $@_{Si,r}$ into an address $@_{Si,t}$. During the execution of the operation 104, it is the value of the parameter q currently selected in the file 42 that is used to parameterize the function 40. The address $@_{Si,t}$ therefore depends on both the address $@_{Si,r}$ received and on the value currently selected of the parameter q. During the first execution of the operation 104, it is the most recent value of the parameter q that is selected.

Subsequently, during an operation 106, the unit 14 selects, in the medium 7, the set $S_{i,t}$ of W lines $L_{i,j}$ situated at the address $@_{Si,t}$.

During an operation 108, the comparator 56 processes one after another the W lines selected. For each of the lines $L_{i,j}$ thus selected, the comparator 56 compares the tag $T_{i,j}$ of this line with the tag $T_r$ received and generates the signal for selecting this line only if the tags $T_{i,j}$ and $T_r$ are identical.

In parallel, during an operation 110, for the same line as that currently being processed by the comparator 56, the comparator 52 compares the value of the counter $C_{i,j}$ of this line with the current value of the counter 50. Only in the case of agreement between the value of the counter $C_{i,j}$ and of the counter 50, the comparator 52 generates the signal for agreement.

Also, in parallel, during an operation 112, the extractor 62 extracts, from within the field $D_{i,j}$ of the line currently being processed by the comparator 56, the word situated at the position identified by the received index $d_r$.

During an operation 114, the circuit 52 transmits a hit signal (or "hit") to the programmable logic controller 60 only if, for the same line $L_{i,j}$, the selection signal and the signal for agreement have been generated, respectively, by the comparators 56 and 52. In all the other cases, the circuit 54 transmits a signal for a miss to the programmable logic controller 60.

In response to a hit signal, during an operation 116, the programmable logic controller 60 transmits to the microprocessor 4 the word extracted during the operation 112 and the method returns to the operation 100 for processing the next read request.

If the circuit 54 has generated a signal for a miss, the method continues with an operation 118. During the operation 118, the programmable logic controller 60 selects, in the file 42, the preceding value of the parameter q which has been stored in it, then returns to the operation 104. The operations 104 to 114 are then once again executed but this time by using the preceding value of the parameter q. If the word sought is found in the cache memory 6 using this preceding value of the parameter q, then the operation 116 is executed, which terminates the iteration of the operations 104 to 114.

In the case where the word sought is found in the cache memory using a preceding value of the parameter q, the operation 116 is however preceded by an operation 120. During the operation 120, the programmable logic controller 60 replaces the W lines $L_{i,j}$ of the set $S_{i,t}$ situated at the address $@_{Si,t}$ obtained using the most recent value of the parameter q by the W lines $L_{i,j}$ selected using the preceding value of the parameter q which enabled the word sought to be found. Thus, if the same word has to be read again prior to the next modification of the function 40, the access to this word will be faster since, for this purpose, it suffices to use the most recent value of the parameter q.

During the operation 120, typically, the W lines $L_{i,j}$ situated at the address $@_{Si,t}$ obtained using the preceding value of the parameter q are subsequently marked as being invalid.

Conversely, if the word sought is not found in the cache memory 6 using this preceding value of the parameter q, then the operation 118 is executed once again. There then exist two cases:

First case: There exists in the file 42 a value of the parameter q which has not yet been used for executing the operations 104 to 114. In this case, these operations 104 to 114 are executed once again with this new preceding value of the parameter q.

Second case: There no longer exists, in the file 42, a preceding value of the parameter q which has not yet been used for executing the operations 104 to 114. In this case, the programmable logic controller 60 triggers the execution of the step 80.

The step 84 starts with an operation 130 for receipt by the cache memory 6 of a request for writing a word. This write request, like a read request, comprises the address @r of the word to be written and hence the tag $T_r$, the address $@_{Si,r}$ and the index $d_r$. This write request additionally comprises the value $V_r$ to be written. The step 84 then comprises, successively, the operations 132, 134, 136, 138 and 140.

The operation 132 is identical to the operation 102 except that the value $V_r$ received is, in addition, stored in the register $V_r$.

The operations 134 and 136 are identical, respectively, to the operations 104 and 106.

During the operation 138, the comparator 56 processes, one after another, the W selected lines $L_{i,j}$. This operation is identical to the operation 108. In the case of the processing of a write request, the operations similar to the operations 112 and 114 do not need to be executed or, if they are executed, their result may be ignored. Thus, in the case of the processing of a write request, the selection signal and, in alternation, the signal for absence of selection are systematically transformed by the circuit 54 into, respectively, a hit signal and a miss before being transmitted to the programmable logic controller 60.

During an operation 140, if a hit signal is received by the programmable logic controller 60, in response, the latter triggers the writing of the value $V_r$ in the word of the line $L_{i,j}$ which has triggered the generation of this hit signal.

Conversely, if the programmable logic controller 60 has received a signal for a miss for each of the W selected lines $L_{i,j}$, the programmable logic controller 60 executes an operation 142. The operation 142 is, for example, identical to the operation 118 except that the method returns to the operation 134 rather than to the operation 104. Thus, the word to be written is also sought using the preceding values of the parameter q in order to limit the number of times where the step 80 is executed. In addition, in the case where the word sought is found using a preceding value of the parameter q, the operation 140 is preceded by an operation 142 identical to the operation 120.

Figure 4:
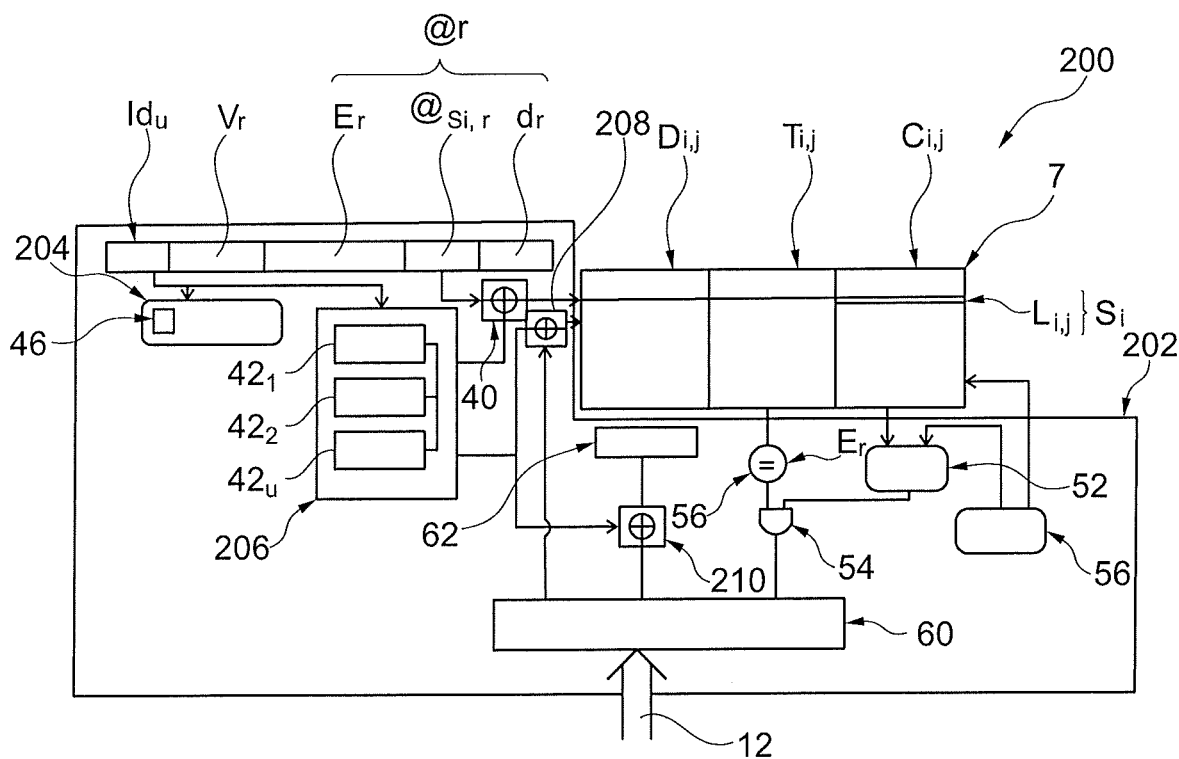
FIG. 4 is a schematic illustration of another possible embodiment of the unit for managing the cache memory of the computer in FIG. 1.

FIG. 4 shows schematically the architecture of a cache memory 200 able to be used in place of the cache memory 6 in the computer 2. The cache memory 200 is similar to the cache memory 6 except that it is modified so as to:

use a different addressing for each different process executed in parallel by the microprocessor 4, and scramble the words stored in the cache memory 200.

In this embodiment, the write and read requests received by the cache memory 200 additionally comprise an identifier $Id_u$ of the process executed by the microprocessor 4 which has generated this request.

The cache memory 200 is for example identical to the cache memory 6 except that the management unit 14 is replaced by a management unit 202.

The unit 202 is identical to the unit 14 except that:

it comprises an additional register Id designed to contain the identifier $Id_u$ of the process which has generated the read or write request, the generator 44 is replaced by a generator 204, the file 42 is replaced by a set 206 of files $42_u$, and the unit 202 additionally comprises a scrambler 208 and an unscrambler 210.

The generator 204 is identical to the generator 44 except that it draws at random or pseudo-randomly a new value of the parameter q for each different process being executed. Thus, when the counter 46 reaches the limit $Lmax_{46}$, instead of generating only one new value of the parameter q, it generates as many new values of the parameter q as there are different processes being executed. Thus, each process disposes of its own new value of the parameter q. In the following, the parameter q associated with a particular process is denoted $q_u$, where the index u is an identifier of the process being executed by the microprocessor 4.

For each parameter $q_u$, the generator 204 also generates, at the same time as the new value of this parameter $q_u$, a new value for a scrambling key $k_u$. Each key $k_u$ is associated with the parameter $q_u$ having the same index u. Typically, the new value of the key $k_u$ is drawn at random or pseudo-randomly. Here, the size of each key $k_u$ is equal to the size of a word. Thus, the new value of a key $k_u$ is drawn at random or pseudo-randomly from within the set $E_q$.

The set 206 comprises as many files $42_u$ as different processes being executed. Each file $42_u$ is associated with a single process. The index u in the numerical reference $42_u$ is the identifier of the process associated with this file $42_u$.

Each file $42_u$ here is identical to the file 42 and operates like the file 42 except that, in addition, for each value of the parameter $q_u$, it stores the value of the key $k_u$ associated with this value of the parameter $q_u$. Thus, each value of the key $k_u$ is stored in the file $42_u$ associated with the value of the parameter $q_u$ which has been generated at the same time as this value of the key $k_u$.

The scrambler 208 scrambles each word stored on the medium 7 by means of the most recent value of the key $k_u$. Here, the terms "scramble" and "encrypt" are considered as synonyms. In this embodiment, the scrambling of a word is carried out, for example, by means of the following relationship: $W_{i,j,d}^* = W_{i,j,d} \text{ XOR } k_u$, where $W_{i,j,d}$ and $W_{i,j,d}^*$ are respectively the word to be scrambled and the cryptogram of the word scrambled.

The scrambler 208 is connected to the set 206 in order to obtain the value of the key $k_u$ to be used for the scrambling.

The unscrambler 210 unscrambles the word extracted from the cache memory 200 before transmitting it to the microprocessor. Here, the terms "unscramble" and "decrypt" are considered as synonyms. For this purpose, the unscrambler 210 is connected to the output of the extractor 62 in order to receive the cryptogram $W_{i,j,d}*$ and to the set 206 in order to receive the value of the key $k_u$ to be used for the unscrambling. The unscrambler 210 transmits the unscrambled word to the programmable logic controller 60.

The operation of the unit 202 will now be described by means of the method in FIG. 5.

The method comprises an initialization/reset phase 270 identical to the phase 70 except that an initial value is stored for each parameter $q_u$. Similarly, during this initialization/reset phase, initial values of the keys $k_u$ are also generated and stored in the files $42_u$. If the number of processes executed in parallel is not known in advance, the phase 270 may be executed each time that the execution of a new process by the microprocessor 4 starts.

Subsequently, during a phase 272, several processes are executed in parallel by the microprocessor 4. Here, each of these processes is associated with its own identifier $Id_u$. The identifier $Id_u$ of the process is indicated in each read or write request. The phase 272 is for example identical to the phase 72 except that the steps 80, 82, 84 and 86 are replaced, respectively, by steps 280, 282, 284 and 286.

The step 280 is identical to the step 80 except that it additionally comprises, between the operations 90 for loading of the lines from the main memory 8 and the operation 92 for storing these lines on the medium 7, an operation 291 for scrambling each word of the lines loaded. The scrambling of the loaded words is carried out by the scrambler 208 using the most recent value of the key $k_u$ associated with the process which has generated the request which has triggered the miss.

During the operation 92, the stored lines $L_{i,j}$ therefore comprise the cryptograms of the words rather than the unencrypted words, in other words the non-scrambled words.

The step 282 is identical to the step 82, except that:
the read request received comprises the identifier $Id_u$ of the process having generated this request,
during the operations 104 to 114, it is the most recent value and the preceding values of the parameter $q_u$ stored in the file $42_u$ associated with the received identifier $Id_u$ which are used, as has already been described during the step 80 in the case of the parameter q,
the operation 116 is preceded by an operation 315 for unscrambling words extracted by the extractor 62, and
the operation 120 is replaced by an operation 320.

During the operation 315, the unscrambler 210 uses the most recent value of the key $k_u$ which is associated with the identifier $Id_u$ received. The unscrambler 210 subsequently transmits the unscrambled word to the programmable logic controller 60.

The operation 320 is identical to the operation 120 except that, before moving the lines, the cryptograms contained in these lines are unscrambled by the unscrambler 210 using, for this purpose, the value of the key $k_u$ associated with the value of the parameter $q_u$ which has enabled the word sought in the cache memory 200 to be found. Subsequently, each of the unencrypted words obtained is scrambled again, by the scrambler 208, using for this purpose the most recent value of the key $k_u$. Thus, the words of the lines moved into the set $S_{i,t}$ corresponding to the address $@_{Si,t}$ obtained with the most recent value of the parameter $q_u$ are scrambled with the value of the key $k_u$ associated with this the most recent value of the parameter $q_u$.

The step 284 is identical to the step 84 except that:
the write request received comprises the identifier $Id_u$ of the process having generated this request,
during the operations 134 à 138, it is the most recent value and the preceding values of the parameter $q_u$ stored in the file $42_u$ associated with the identifier $Id_u$ received which are used as has already been described during the step 84 in the case of the parameter q,
the operation 140 is preceded by an operation 339 for scrambling the word to be written, and
the operation 142 is replaced by an operation 342.

During the operation 339, the value $V_r$ received is scrambled by the scrambler 208 using the most recent value of the key $k_u$. Subsequently, during the operation 140, it is the cryptogram thus obtained which is stored in the line $L_{i,j}$.

The operation 342 is, for example, identical to the operation 315.

The step 286 is identical to the step 86 except that it is the generator 204 and the files $42_u$ that are used in place, respectively, of the generator 44 and of the file 42. Thus, the execution of the step 286 allows the function 40 to be repeatedly modified for all the processes executed.

It will be noted that, in this embodiment, the addressing of the cache memory 200 is different for each of the processes executed because each of these processes is associated with its own value of the parameter $q_u$. This contributes to improving the robustness of the cache memory 200 against side-channel attacks. In particular, it is very difficult for a process executed by the microprocessor 4 to obtain information on the addressing of the cache memory used by another process.

Chapter II—Variants

All the variants described in the context of the unit 14 may be transposed and applied to the unit 200 and vice-versa. Thus, in the following, the different variants are mainly described only in the context of the management unit 14.

Variants Relating to the Parameter q:

As a variant, the set $E_q$ comprises only $2^p$ different values, where the exponent p is an integer number strictly less than n. In this case, the function 40 must be adapted to take into account the fact that the parameter q is coded over p bits rather than over n bits. For example, a first solution consists in combining only p bits of the address $@_{Si,r}$ with the parameter q. Another solution consists in generating a word of n bits using the parameter q coded over p bits then in combining this n-bit word with the address $@_{Si,r}$ so as to obtain the address $@_{Si,t}$. In another variant, the number p is greater than the number n.

Other methods of selecting the preceding values of the parameter q are possible. In particular, the different values of the parameter q stored in the file 42 are not necessarily selected in the order starting from the most recent value towards the oldest value. For example, in one alternative embodiment, each time that a preceding value of the parameter q has to be selected, the latter is selected by random drawing from amongst the R preceding values stored in the file 42. If after a predetermined number Rmax of random drawings, the word sought has not been found, then a miss is triggered. In another possible embodiment, all the values of the parameter q are systematically selected one after another. Accordingly, even after having selected a value of the parameter q which allows the word sought to be found in the cache memory 6, the method does not stop and the following values of the parameter q are still selected one after another. Thus, the search time for a word in the cache memory is systematically constant. Thanks to this, it is not possible to obtain information on the position of the preceding value of the parameter q used to find the word sought. This embodiment is therefore more robust against side-channel attacks.

In another embodiment, the new value of the parameter q is not constructed by the generator 44 but directly by the microprocessor 4 itself. In this case, each time that the microprocessor 4 wishes to read or write a word in the cache memory 6, the request transmitted to this cache memory comprises, in addition, the most recent value of the parameter q to be used for reading or writing a word. In this case, preferably, when several process are executed simultaneously by the computer 2, each of these processes transmits to the cache memory a value of the parameter q specific and personal to it.

The triggering of the generation of a new value of the parameter q may be carried out differently. For example, in another embodiment, the generator 44 comprises a timer which counts down a period T44. Each time that the period T44 has expired, the generator 44 generates a new value of the parameter q then starts again to count down the period T44. Thus, in this case, the interval for renewing the value of the parameter q is independent of the number of accesses to the cache memory 6. In another embodiment, it is an event other than an access to the cache memory 6 which is counted and which triggers the generation of a new value of the parameter q when the limit Lmax$_{46}$ is reached. For example, instead of counting the accesses to the cache memory 6, the generator 44 may count the number of misses or the number of hits or any other event measurable by the cache memory 6. The generation of a new value of the parameter q may also be triggered each time that a new process is executed by the computer 2 or upon each change of context. The phrase "change of context" denotes the fact that the microprocessor 4 stops executing the instructions of a first process in order to continue with or start the execution of a second process. In this case, the intervals for renewing the values of the parameter q are not necessarily regular. Finally, in another exemplary embodiment, the generation of a new value of the parameter q is triggered in response to the receipt of a particular command generated by the microprocessor 4.

There exist methods other that a random or pseudo-random drawing for generating a new value of the parameter q. For example, the values of the set E$_q$ are classified in a predetermined order from a first value up to a last value. The new value of the parameter q is taken equal to the value which immediately follows the preceding value of this parameter in the predetermined order. When the preceding value of the parameter q is equal to the last value of the set E$_q$, the new value of the parameter q is taken equal to the first value of this set E$_q$. Thus, the value of the parameter q varies in a cyclical manner. In another variant, the new value of the parameter q is constructed based on its preceding value. For example, the new value is constructed by means of the following relationship: $q_{new} = q_{old} \cdot k_e \mod p$, where:

q$_{new}$ and q$_{old}$ are, respectively, the new and the old values of the parameter q, k$_e$ is a constant integer number coded over p bits, and q$_{old}$·k$_e$ mod p is the operation for modular multiplication of the value q$_{old}$ by the number k$_e$ modulo p.

In order to generate a new value of the parameter q, it is also possible to take into account data received or generated by the cache memory. For example, when the limit Lmax$_{46}$ is reached, the new value of the parameter q is constructed based on the value of the last tag T$_r$ received. One solution for doing this is to use the following relationship: q=T$_r$ mod n.

In another embodiment, the unit 14 is modified so as to additionally permute the received values of the index d$_r$ in such a manner as to obtain a transformed index d$_{r,t}$. Subsequently, it is this index d$_{r,t}$ which is used for selecting the word to be read or to be written. In other words, what has been described for transforming the received address @$_{Si,r}$ may also be applied furthermore to the index d$_r$. Those skilled in the art can easily transpose the teaching presented here in the case of the address @$_{Si,r}$ to the index d$_r$ in order to obtain such an embodiment.

Other Variants:

In one simplified embodiment, the counter 50 and the counters C$_{i,j}$ associated with each of the lines are omitted. This is acceptable notably if the probability that an obsolete line is used is negligible.

In another simplified embodiment, the file 42 comprises a single register containing only the most recent value of the parameter q. In this case, the iteration of the operations 104 to 114 is omitted. On the other hand, the number of misses is then greater, a fact which slows down the execution of the processes. However, in certain contexts, such a slowing down for the benefit of an increase in the robustness against side-channel attacks is acceptable.

As a variant, the number M is greater than the number R or strictly less than the number R. In one particular case, the number M may be chosen equal to zero.

The number of accesses to the cache memory between two successive modifications of the function 40 may be higher than 1,000. For example, as a variant, this number is higher than 5,000 or 10,000. This number may also be less than 100 in some particular cases requiring a very high level of security.

The scrambling and the unscrambling of the words stored in the cache memory 200 may be implemented with the cache memory 6. In this case, the key k$_6$ used to scramble and unscramble the words may be common to all the processes executed in parallel. The generator 44 is designed to generate a new value of the key k$_6$ each time that it generates a new value of the parameter q. Preferably, in this case, new values of the parameter q and of the key k$_6$ are generated upon each change of context. A scrambler and an unscrambler similar, respectively, to the scrambler 208 and to the unscrambler 210 are also implemented in the unit 14 for managing the cache memory. The operation of the scrambler and of the unscrambler in the context of the cache memory 6 may be deduced from the explanations given with reference to FIGS. 4 and 5.

The cache memory may be divided into various levels of cache memory conventionally called "L1 cache", "L2 cache", "L3 cache", etc. The time for accessing these various levels increases going from the L1 cache towards the L3 cache. Moreover, these various levels of cache memory are not necessarily installed on the same die. For example, the L1 cache may be implemented inside of the microprocessor 4, whereas the higher levels are implemented outside of the microprocessor 4. The methods for managing a cache memory described here are applicable to each of these levels of cache memory. Preferably, the methods described here are applied to each of these levels.

What has been described here is applicable, in particular, to the cache memories which are only used by one process at a time. Such cache memories are not used for sharing data between various processes being simultaneously executed.

The mass storage may be situated outside of the computer and connected to this computer via a bus or a data transmission network. Similarly, the main memory may also be mechanically situated outside of the computer and connected to this computer via a bus or a data transmission network.

What has been described here is applicable to other lengths of word and of lines.

It will also be noted that the teaching presented here is also applicable to the case of direct mapped cache memories. In this case, the number W is equal to one and the address $@_{S_i,r}$ corresponds to a single line of the cache memory.

The tag $T_r$ may be constructed just as easily based on the physical address $@r_r$ of the word sought as on the virtual address $@r_v$ of this word sought. Indeed, it is always possible to convert a physical address into a virtual address and vice-versa. This is typically the function of a memory management unit known by the acronym MMU.

In another embodiment, the index $d_r$ is omitted in the request for reading a word in the cache memory. In this case, in the case of a correspondence between the tag $T_r$ and one of the tags $T_{i,j}$, the cache memory 6 sends the complete field $D_{i,j}$ to the microprocessor 4. It is subsequently the microprocessor 4 which itself carries out the extraction of the desired word from the received field $D_{i,j}$.

Instead of comprising a single microprocessor, the electronic computer may comprise several microprocessors each capable of accessing the cache memory 6. In this case, each process executed in parallel with the others is, for example, executed by its own microprocessor. What has been described here in the particular case where the various processes are executed, in parallel, by the same microprocessor 4 operates in the same manner in the case of such an electronic computer equipped with several microprocessors.

Variants of the Method:

In one possible variant of the method, the line found in the cache memory using a preceding value of the parameter q is not moved into the set situated at the address $@_{S_i,t}$ obtained with the most recent value of the parameter q. In other words, the operation 120 is omitted.

Figure 3:
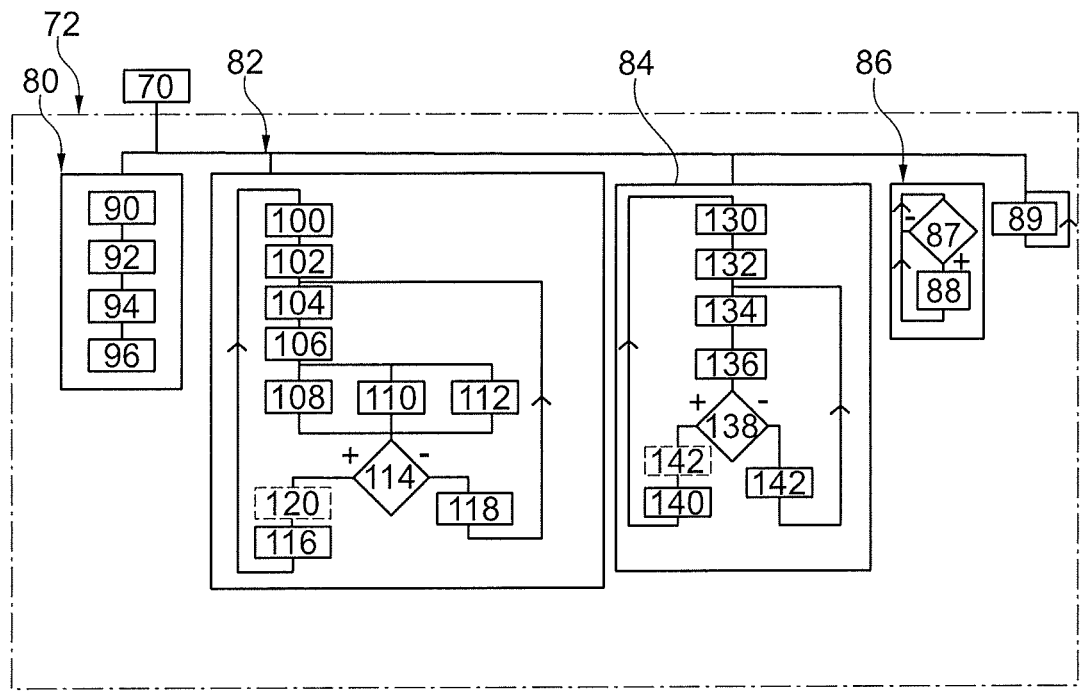
FIG. 3 is a flow diagram of a method for managing the cache memory of the computer in FIG. 1.
Figure 5:
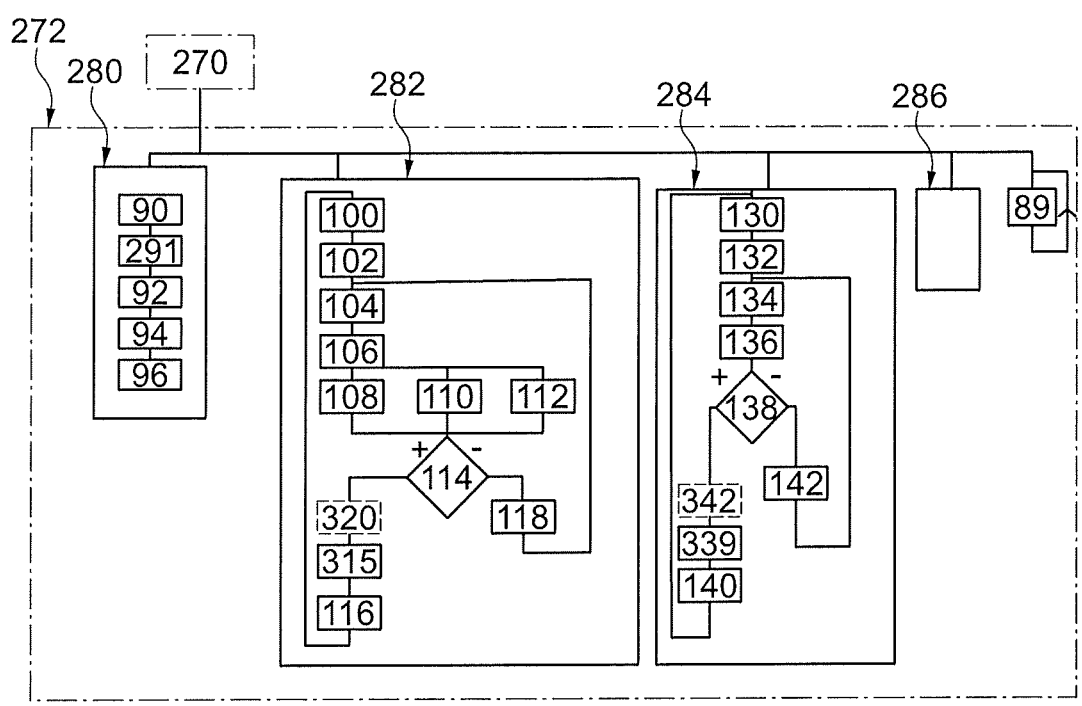
FIG. 5 is a flow diagram of a method for managing the cache memory by means of the management unit in FIG. 4.

The order of the operations of the management method in FIGS. 3 and 5 may be modified. For example, in one variant, the operation 110 is executed only if, during the operation 108, a correspondence has been found between the tag $T_r$ and one of the tags $T_{i,j}$. It is also possible to do the reverse, in other words the operation 108 is executed only if, during the operation 110, the value of the counter $C_{i,j}$ agrees with the current value of the counter 50.

Chapter III—Advantages of the Embodiments Described

Using transformation functions which permute simultaneously at least 50% of the addresses $@_{S_i,r}$ increases the difficulty for implementing a side-channel attack on this cache memory. Indeed, the addressing of the cache memory before and after the modification of the function 40 are very different. It is then very difficult to obtain information on the operation of a process by observing its accesses to the cache memory or by measuring the time for accessing the cache memory when the modification of the addressing takes place during the execution of this process. In addition, the modification of the addressing relates both to the case of hits and to the case of misses. Thus, with respect to the method described in the article by Zhenghong et al., the methods described here increase to a much greater extent the diversity of the access to the cache memory. The methods described here are therefore more robust against side-channel attacks.

The use of the counter 50 and of the line counters $C_{i,j}$ allows the second secondary effect to be reduced without however slowing down the execution of the processes as a consequence. It will be noted, in this respect, that in order to counteract such a secondary effect, the article by Zhenghong et al. teaches rendering invalid the lines whose addressing has changed. However, this method is not transposable to the situation described here where the majority of the addresses $@_{S_i,r}$ are permuted at the same time. Indeed, invalidating the lines of each of the sets $S_{i,r}$ whose addresses have been permuted amounts to ejecting from the cache memory a very large number of lines each time that the function 40 is modified. However, ejecting a large number of lines from the cache memory to a memory of higher rank greatly slows down the execution of the processes. Similarly, this same article indicates that another, less efficient, method consists in moving the lines into the cache memory in order to avoid the appearance of obsolete lines. However, this other method proposed by the article of Zhenghong et al. is not applicable to the present situation either, where the majority of the set addresses are permuted at the same time. Indeed, in this case, it would be necessary to move a very large number of lines into the cache memory, which also greatly slows down the execution of the processes.

The use of the preceding values of the parameter q in order to search for a word in the cache memory allows the number of misses caused by a modification of the function 40 to be substantially limited. This therefore minimizes the first secondary effect described previously.

Storing a line found in the cache memory using a preceding value of the parameter q at the location corresponding to the address $@_{S_i,t}$ obtained using the most recent value of the parameter q allows a faster recovery of this line if the latter is read or written again before the next modification of the function 40.

Randomly or pseudo-randomly drawing the new value of the parameter q from within a set of more than $2^8$ different values increases the robustness of the computer 2 against attempts at a side-channel attack.

The use of different values of the parameter $q_u$ for each of the processes executed in parallel also increases the robustness of the method against side-channel attacks. Indeed, under these conditions, it is very difficult for a process of deduce information on the operation of the addressing of the cache memory by another process.

The invention claimed is:

1. A method for managing a cache memory of an electronic computer, this method comprising the following steps during the execution, by this computer, of a process designed to process a word:
   a) receipt of a request containing an address of the word to be read or to be written, this address comprising:
      a line tag,
      a set address, this set address belonging to a first set of s different values, where the value s is an integer greater than two,
   b) transformation of the set address received into a transformed set address by means of a bijective transformation function which permutes at least two values from the first set,
   c) selection of one or more line tags stored in the cache memory at the transformed set address,
   d) comparison of the line tag received with the line tag or tags selected as a function of the transformed set address, in order to determine whether one of these line tags selected corresponds to the received line tag, e) when none of the tags selected corresponds to the received line tag, triggering of a miss and a supply of the word from a memory of higher rank, and when, on the contrary, one of the selected line tags corresponds to the received line tag, reading or writing in the cache memory of the word inside of a line associated with the line tag which corresponds to the received line tag, f) modification of the transformation function, this modification of the transformation function being repeated several times during the execution of the process such that, during the same execution of the process, the transformation function associates, successively over time, with a same set address able to be received, several different transformed set addresses, in which:

the transformation function is parameterized by a parameter q such that the transformed set address obtained during the step f) depends both on the set address received and on a value of this parameter q, and for all non-zero values of the parameter q, the transformation function permutes at least 50% of the set addresses, and during each execution of the step f), a new value of the parameter q is generated for modifying the transformation function.

2. The method according to claim 1, in which:

a modification counter is incremented at each modification of the transformation function, each time that a new line is stored in the cache memory, a current value of the modification counter is stored in a line counter associated only with this line, when one of the selected line tags corresponds to the received line tag, then the method comprises:

comparison of a value of the line counter of the line comprising this line tag with the value of the modification counter, when the value of the line counter is less than $C_m$–M, then reading or writing of the word in the cache memory is inhibited and a miss is triggered, and conversely, when the value of the line counter is greater than or equal to $C_m$–M, then the miss is not triggered and the reading or the writing of the word in the cache memory goes ahead, where:

$C_m$ is the value of the modification counter at the time when the value of the line counter is compared with the value of the modification counter, and M is an integer number in the range between 1 and 50.

3. The method according to claim 2, in which the method comprises:

marking of the set of lines of the cache memory as being invalid in response to the exceeding by the modification counters of a predetermined threshold, and inhibition of a use of each line marked as being invalid until its replacement by a new line loaded from the memory of higher rank.

4. The method according to claim 2, in which:

at each modification of the transformation function, a preceding value of the Parameter q is stored in a file containing R preceding values of the parameter q, where R is an integer number in the range between 1 and 50, when none of the line tags selected corresponds to the received line tag and before triggering a miss and before supplying the word from the memory of higher rank, one of the preceding values of the parameter q is selected in the file and the steps b) to e) are executed once again using the preceding value selected for the parameter q in place of the current value of this parameter q, and in which the number M is equal to the number R.

5. The method according to claim 1, in which:

at each modification of the transformation function, a preceding value of the parameter q is stored in a file containing R preceding values of the parameter q, where R is an integer number in the range between 1 and 50, when none of the line tags selected corresponds to the received line tag and before triggering a miss and before supplying the word from the memory of higher rank, one of the preceding values of the parameter q is selected in the file and the steps b) to e) are executed once again using the preceding value selected for the parameter q in place of the current value of this parameter q.

6. The method according to claim 5, in which, when a line tag corresponding to the received line tag is found in the cache memory using one of the preceding values of the parameter q, the method comprises the replacement of one of the lines of the set situated at the transformed set address obtained based on a most recent value of the parameter q, by the line associated with this line tag corresponding to the received line tag.

7. The method according to claim 5, in which the number R is in the range between 4 and 16.

8. The method according to claim 1, in which:

a counter of accesses to the cache memory is incremented upon each access to the cache memory, and when this counter of accesses to the cache memory reaches a predetermined limit, a new execution of the step f) is automatically triggered and the counter of accesses to the cache memory is reset, the predetermined limit being equal to a number of accesses to the cache memory in the range between 100 and 1000.

9. The method according to claim 1, in which each new value of the parameter q is generated by randomly or pseudo-randomly drawing this new value from a set of $2^p$ different possible values for the parameter q, where the exponent p is an integer number greater than or equal to 4, 8 or 16.

10. The method according to claim 1, in which the method comprises, during a simultaneous execution by the computer of a first and of a second process which process a first and a second word, respectively:

execution of the step f) for, respectively, the first and second process and thus obtain a first value of the parameter q for the first process and a second value of the parameter q for the second process, these first and second values of the parameter q being stored and respectively associated with the first and second processes, when the first process reads or writes the first word, the execution of the steps a) to e) using, for this purpose, the first value of the parameter q, when the second process reads or writes the second word, the execution of the steps a) to e) using, for this purpose, the second value for the parameter q.

11. The method according to claim 1, in which the method also comprises:

each time that a new value of the parameter q is generated, generation of a new value of a key $k_u$, then, for as long as the value of the parameter q is not modified again, scrambling of each word to be written in the cache memory by means of this new value of the key $k_u$ in order to obtain a cryptogram of this word and the storage of the cryptogram in the cache memory in place of the word, and in response to the request containing the address of the word to be read or to be written and if a line comprising a line tag corresponding to the received line tag could be found in the cache memory, the unscrambling of the cryptogram of this line by means of the value of the key $k_u$ generated at the same time as the value of the parameter q used to obtain the transformed set address which has allowed the selection of this line.

12. A management unit for managing a cache memory of an electronic computer, this unit being configured for carrying out the following steps during the execution by this computer of a process which is intended to process a word:

a) reception of a request containing an address of the word to be read or to be written, this address comprising:
a line tag,
a set address, this set address belonging to a first set of s different values, where the value s is an integer greater than two, b) transformation of the set address received into a transformed set address by means of a bijective transformation function which permutes at least two values from the first set, c) selection of one or more line tags stored in the cache memory at the transformed set address, d) comparison of the line tag received with the line tag or line tags selected as a function of the transformed set address, in order to determine whether one of these line tags selected corresponds to the received line tag, e) when none of the selected tags corresponds to the received line tag, triggering of a miss and a supply of the word from a memory of higher rank, and when, on the contrary, one of the line tags selected corresponds to the received line tag, reading or writing in the cache memory of the word inside of a line associated with the line tag which corresponds to the received line tag, f) modification of the transformation function, this modification of the transformation function being repeated several times during the execution of the process such that, during the same execution of the process, the transformation function associates, successively over time, with a same set address able to be received, several different transformed set addresses, in which:

the management unit comprises a transformation function parameterized by a parameter q such that the transformed set address obtained during the step f) depends both on the received set address and on a value of this parameter q, and for all non-zero values of the parameter q, the transformation function permutes at least 50% of the set addresses, and the management unit is configured for, during each execution of the step f), generating a new value of the parameter q for modifying the transformation function.

* * * * *